(12) United States Patent
Kubo

(10) Patent No.: US 6,845,749 B2
(45) Date of Patent: Jan. 25, 2005

(54) START-UP CONTROL DEVICE FOR ENGINE

(75) Inventor: Kengo Kubo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/353,016

(22) Filed: Jan. 29, 2003

(65) Prior Publication Data

US 2003/0168041 A1 Sep. 11, 2003

(30) Foreign Application Priority Data

Mar. 5, 2002 (JP) ........................................ 2002-058577

(51) Int. Cl.⁷ ............................. F02M 3/07; F02P 5/145
(52) U.S. Cl. ............................. 123/339.11; 123/339.21; 123/406.45; 123/406.53
(58) Field of Search ....................... 123/339.11, 339.21, 123/406.45, 406.53

(56) References Cited

U.S. PATENT DOCUMENTS

| | | | | |
|---|---|---|---|---|
| 5,374,224 A | * | 12/1994 | Huffmaster et al. | 123/406.23 |
| 5,492,094 A | * | 2/1996 | Cullen et al. | 123/339.11 |
| 5,884,605 A | | 3/1999 | Nagaishi et al. | |
| 5,950,419 A | * | 9/1999 | Nishimura et al. | 60/274 |
| 6,116,213 A | * | 9/2000 | Yasui et al. | 123/339.11 |
| 6,209,517 B1 | * | 4/2001 | Yasui | 123/339.11 |
| 6,276,131 B1 | * | 8/2001 | Ueno et al. | 123/339.11 |
| 6,470,852 B1 | * | 10/2002 | Kanno | 123/339.23 |
| 6,505,464 B1 | * | 1/2003 | Isobe et al. | 60/277 |
| 6,550,449 B2 | * | 4/2003 | Akazaki et al. | 123/339.11 |
| 6,688,282 B1 | * | 2/2004 | Okubo et al. | 123/339.11 |
| 6,694,946 B1 | * | 2/2004 | Gaskins | 123/339.11 |

FOREIGN PATENT DOCUMENTS

| | | |
|---|---|---|
| JP | 2001-73848 A | 3/2001 |
| JP | 2001-173506 A | 6/2001 |

* cited by examiner

Primary Examiner—Erick Solis
(74) Attorney, Agent, or Firm—Foley & Lardner LLP (57) ABSTRACT

An internal combustion engine (1) is provided with a three-way catalytic converter (16) which purifies exhaust gas, a spark plug (6) which ignites a gaseous mixture and a throttle (11) which regulates an intake air flow rate. When the engine (1) is started, the ignition timing of the spark plug (6) is retarded based on the difference of the rotation speed Ne from a target idle rotation speed Net. If the engine rotation speed Ne is higher than the target idle rotation speed even after the ignition timing has reached a retard limit, the ignition timing is fixed to the retard limit and the intake air flow rate is reduced through the throttle (11), thereby forcing the engine rotation speed Ne to converge rapidly to the target idling rotation speed Net while maintaining the ignition timing at the retard limit to ensure rapid temperature increase in the converter (16).

12 Claims, 9 Drawing Sheets

21 CONTROLLER
22 CRANK ANGLE SENSOR
23 PHASE SENSOR
24 AIR FLOW METER
25 WATER TEMPERATURE SENSOR
26 ACCELERATOR PEDAL DEPRESSION SENSOR
28 TEMPERATURE SENSOR
29 THROTTLE SENSOR

START-UP CONTROL DEVICE FOR ENGINE

FIELD OF THE INVENTION

This invention relates to control of an intake air flow rate and an ignition timing immediately after start-up of an internal combustion engine.

BACKGROUND OF THE INVENTION

Tokkai 2001-73848 published by the Japanese Patent Office in 2001 proposes an idling control device of an internal combustion engine regulating the ignition timing for a gaseous mixture and the intake air flow rate. This control aims to prevent the rotation speed of the engine from undergoing excessive increase during the start-up process.

SUMMARY OF THE INVENTION

A three-way catalytic converter is provided in the exhaust passage of the engine in order to purify exhaust gas generated by the combustion in the engine. This three-way catalytic converter performs reduction of nitrogen oxides (NOx) as well as oxidation of hydrocarbons (HC) and carbon monoxide in the exhaust gas. In order to optimize the performance of the three-way catalytic converter, it is necessary to maintain the air/fuel ratio of the gaseous mixture for the combustion to a narrow range centering on a stoichiometric air/fuel ratio as well as to ensure that the three-way catalyst in the converter has reached an activation temperature.

Therefore when starting up the engine, the temperature of the three-way catalyst must be raised as rapidly as possible. The best way to raise temperature of the three-way catalyst is to increase the exhaust gas temperature of the engine. However, if the rotation speed of the engine is suppressed during engine start-up by an idling control device as disclosed by the prior art, is difficult to rapidly increase the exhaust gas temperature.

It is therefore an object of this invention to rapidly increase the exhaust gas temperature during the engine start-up process while preventing excessive increase in the rotation speed.

In order to achieve the above object, this invention provides a start-up control device for such an internal combustion engine that comprises a throttle regulating an intake air flow rate and a spark plug igniting a gaseous mixture. The device comprises a controller functioning to control an ignition timing of the spark plug to cause the rotation speed of the engine converge to a target idle rotation speed, and control an opening of the throttle to cause the intake air flow rate to be reduced, if the rotation speed is still not converged to the target idle rotation speed after the ignition timing of the spark plug has been controlled.

This invention also provides a start-up control method of such an internal combustion engine that comprises a throttle regulating an intake air flow rate and a spark plug igniting a gaseous mixture. The method comprises detecting a rotation speed of the engine, controlling an ignition timing of the spark plug to cause the rotation speed of the engine converge to a target idle rotation speed, and controlling an opening of the throttle to cause the intake air flow rate to be reduced, if the rotation speed is still not converged to the target idle rotation speed after the ignition timing of the spark plug has been controlled.

The details as well as other features and advantages of this invention are set forth in the remainder of the specification and are shown in the accompanying drawings.

DESCRIPTION OF THE PREFERRED EMBODIMENTS

Figure 1:
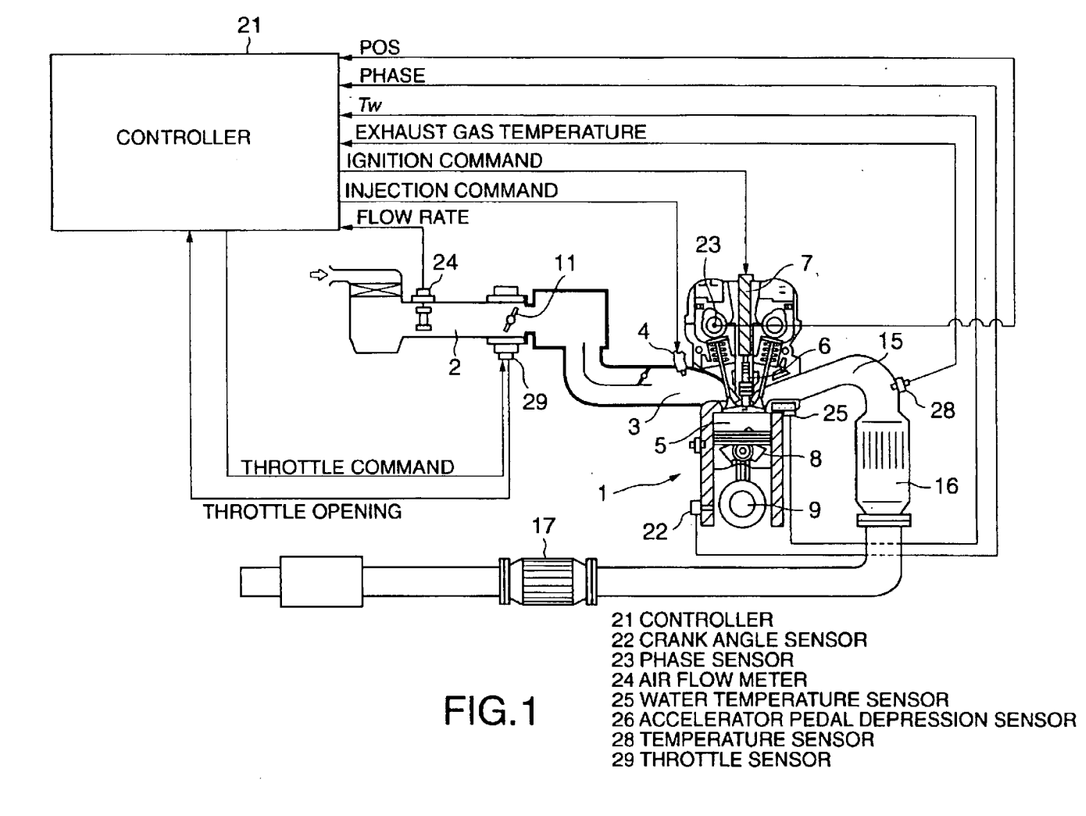
FIG. 1 is a schematic diagram of an idling control device for an internal combustion engine according to this invention.

Referring to FIG. 1 of the drawings, a combustion chamber 5 is formed in each cylinder of a multi-cylinder internal combustion gasoline engine of a vehicle. Air is supplied through an intake port 3 from an intake passage 2 to the combustion chamber 5. A fuel injector 4 is provided in the intake port 3. The fuel injector 4 injects fuel towards the intake air aspirated into the combustion chamber 5 from the intake air port 3 in response to an injection signal from an engine controller 21. The air flow rate of the intake passage 2 is regulated by an electronic throttle 11 connected to a step motor operated in response to signals from the controller 21.

A gaseous mixture of fuel and intake air is ignited by a spark plug 6 and burned in the combustion chamber 5. A piston 8 housed in each cylinder is depressed due to the combustion of the gaseous mixture and rotates a crank shaft 9 connected to each piston 8. The spark plug 6 generates a spark when a sparking coil 7 cuts off a primary current in response to an ignition signal from the controller 21. The controller 21 outputs the ignition signal slightly before the piston 8 reaches compression top dead center.

An exhaust gas generated by the combustion of the gaseous mixture is discharged from an exhaust passage 15. An upstream three-way catalytic converter 16 and a downstream catalytic converter 17 are provided in series in the exhaust gas passage 15 in order to oxidize hydrocarbons and carbon monoxide as well as to reduce nitrogen oxides present in the exhaust gas. The upstream three-way catalytic converter 16 is provided in an upstream part of the exhaust passage 15 in proximity to the engine 1 in order to obtain a high exhaust gas temperature. The downstream three-way catalytic converter 17 is disposed under the floor of the vehicle.

Figure 2A:
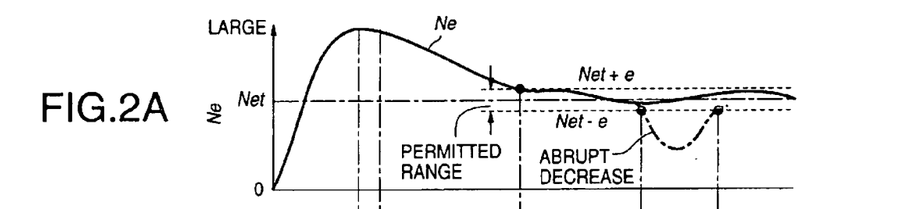
FIGS. 2A–2F are timing charts showing the variation in respective characteristics during engine start-up when performing idling control according to this invention.
Figure 2B:
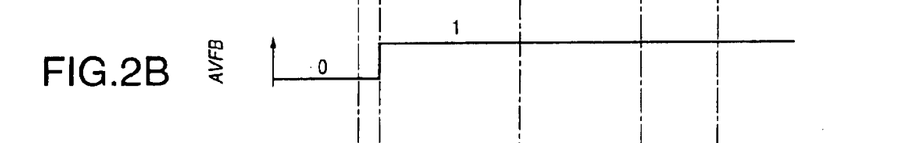

During the start-up operations of the engine 1, air is aspirated into the combustion chamber 5 by reciprocal motion of the piston 8 as a result of cranking the crankshaft 9 using a starter motor not shown. Fuel is injected into the combustion chamber 5 from the fuel injector 4 and the gaseous mixture is ignited by the spark plug 6. When the engine 1 starts to rotate as a result of the combustion of the gaseous mixture, it races and overshoots a target idle rotation speed Net during idling as shown in FIG. 2A. Thereafter the rotation speed decreases until it stabilizes in proximity to the target idle rotation speed Net. In the figure, Ne designates the rotation speed of the engine 1. In the description hereafter, the start timing of the engine 1 means the time at which cranking by the starter motor starts.

Once the engine 1 has been started, it is preferred that the three-way catalyst in the upstream three-way catalytic converter 16 is activated as soon as possible in order to purify the exhaust gas. For this purpose, it is necessary to increase the temperature of the upstream three-way catalytic converter 16.

Although it is preferred that the engine rotation speed Ne of the engine 1 is high immediately after startup, the overshoot described above results in noise and vibration in the vehicle. Thus when controlling idling operations, it is preferred that the overshoot is suppressed and that the engine rotation speed Ne rapidly converges to the target idle rotation speed Net In order to satisfy the above requirement, during start-up operations of the engine 1, the controller 21 performs feedback control of the ignition timing for the spark plug 6 so that the engine rotation speed Ne converges to the target idle rotation speed Net. More precisely, when the engine rotation speed Ne is greater than the target idle rotation speed Net, the engine rotation speed Ne is reduced by retarding the ignition timing.

Thereafter when the ignition timing reaches the retard limit and the engine rotation speed Ne still exceeds the target idle rotation speed Net, the intake air flow rate of the engine 1 is feedback controlled while keeping the ignition timing at the retard limit so as to converge the engine rotation speed Ne to the target idle rotation speed Net.

Referring to FIGS. 2A–2F, the engine rotation speed Ne increases rapidly immediately after start-up, exceeds the target idle rotation speed Net by a considerable margin, reaches a peak at a time t1 and thereafter decreases. Feedback control on the ignition timing is initiated at a time t2 when the engine rotation speed Ne starts to decrease from the peak. In practice, the initial timing for feedback control of the ignition timing may be set to a predetermined time after the engine start-up.

Herein the difference ΔNe of the engine rotation speed Ne and the target idle rotation speed Net is calculated. The difference ΔNe is used in order to calculate the feedback correction amount ADVQ for the ignition timing. A target ignition timing ADV is calculated by adding the feedback correction amount ADVQ to the basic ignition timing ADV0. The basic ignition timing ADV0 is a value which is set in response to a cooling water temperature of the engine 1. It is necessary to retard the ignition timing in order to reduce the engine rotation speed Ne. Thus the ignition timing ADV is retarded after the time t2.

Figure 2C:
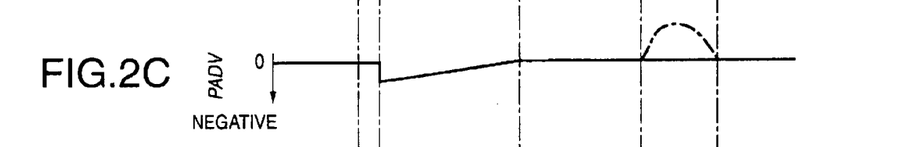
Figure 2D:
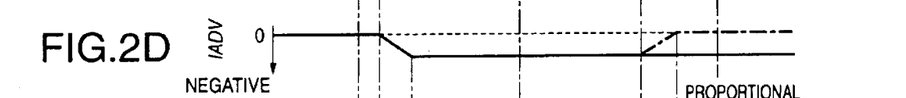
Figure 2E:
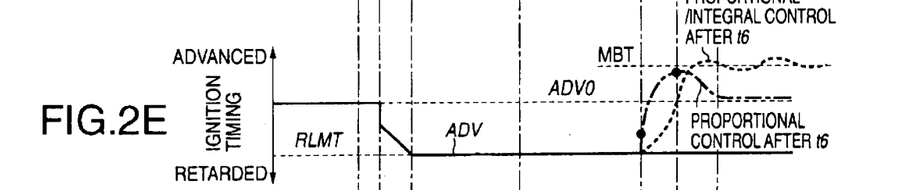

The feedback control on the ignition timing comprises proportional/integral control. The feedback correction amount ADVQ represents the total of a proportional component PADV shown in FIG. 2C and an integral component IADV shown in FIG. 2D. Consequently, the ignition timing is retarded as shown in FIG. 2E. It is well-known to a person skilled in the art that the exhaust gas temperature will increase when the ignition timing is retarded.

At a time t3, the ignition timing reaches the retard limit RLMT. The controller 11 stops the feedback control on the ignition timing and fixes the ignition timing to the retard limit RLMT.

Figure 3:
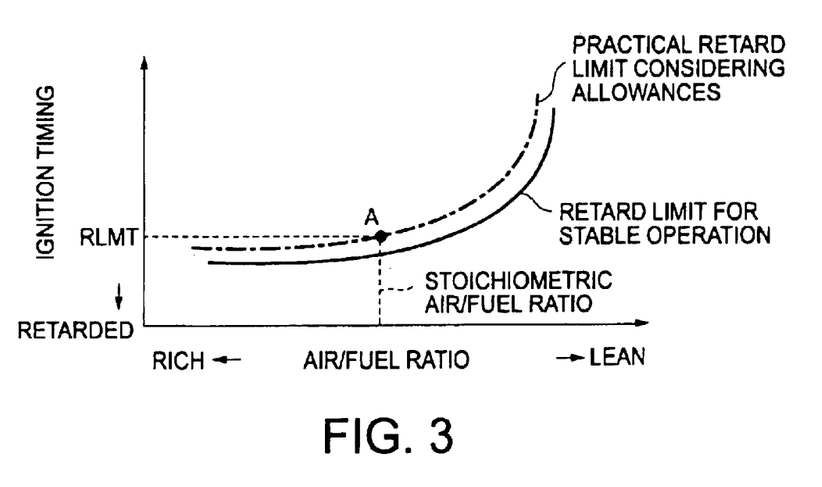
FIG. 3 is a diagram showing a retard limit on the ignition timing for the engine.

Referring to FIG. 3, the ignition timing depends on the air/fuel ratio of the gaseous mixture combusted in the combustion chamber 5. The solid curve shown in the figure is obtained when the stable operation limiting retard amounts for the ignition timing at various air/fuel ratios are connected. The stable operation limiting retard amounts are values at which an idle rotation speed does not become unstable. The curve therefore represents the stable operation limiting line. Considering some allowances, the curve represented by the dotted line positioned slightly more towards an advancing side than the stable operation limiting line becomes the stable operation limiting line in practice. If the air/fuel ratio during startup operation of the engine 1 is known, the intersection of the straight line extending upwardly in the figure from that value with the dotted line in the figure becomes the actual retard limit RLMT. When the startup of the engine 1 is performed at a stoichiometric ratio, the point A represents the retard limit RLMT.

Figure 2F:
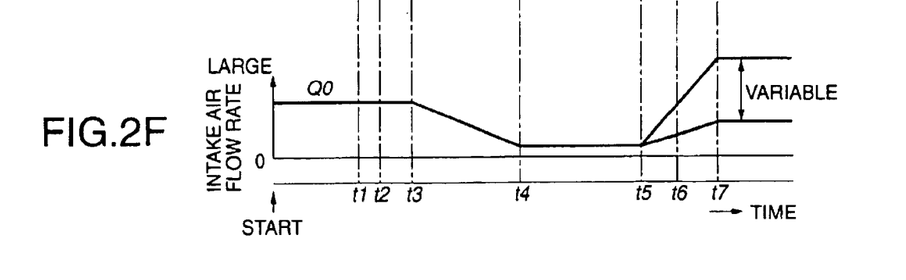

Referring again to FIGS. 2A–2F, when the ignition timing at the time t3 has reached the retard limit RLMT, the engine rotation speed Ne still exceeds the target idle rotation speed Net by a large margin. The controller 21 then initiates feedback control on the intake air flow rate while maintaining the ignition timing at the retard limit RLMT. That is to say, in order to make the engine rotation speed Ne converge to the target idle rotation speed Net, the intake air flow rate is decreased as shown in FIG. 2F.

As a result, at a time t4, the difference of the engine speed Ne and the target idle rotation speed Net is held within a permitted range ε.

Thus at the time t4, although the convergence of the engine rotation speed Ne to the target idling rotation speed Net is mainly complete, the controller 21 maintains the ignition timing at the retard limit RLMT thereafter in order to promote temperature increase in the three-way catalytic converter 16.

The controller 21 performing the above control comprises a microcomputer provided with a central processing unit (CPU), a read-only memory (ROM), a random access memory (RAM) and an input/output interface (I/O interface). The controller 21 may comprise a plurality of microcomputers.

The controller 21 is connected by a signal circuit to the following components in order to perform the above control. A phase sensor 23 outputs a PHASE signal corresponding to a reference stroke position of the piston 8 in each cylinder of the engine 1. A crank angle sensor 22 outputs a POS signal when the engine 1 rotates once for example. An air flow meter 24 detects the intake air flow rate of the engine 1. A water temperature sensor 25 detects the cooling water temperature Tw of the engine 1. An accelerator pedal depression sensor 26 detects the depression amount of an accelerator pedal of the vehicle. A temperature sensor 28 detects the exhaust gas temperature at an inlet of the upstream three-way catalytic converter 16. A throttle sensor 29 detects an opening of the electronically-controlled throttle 11.

Each routine executed by the controller 21 for the above control will be described hereafter referring to FIGS. 4, 5A–5C.

Figure 4:
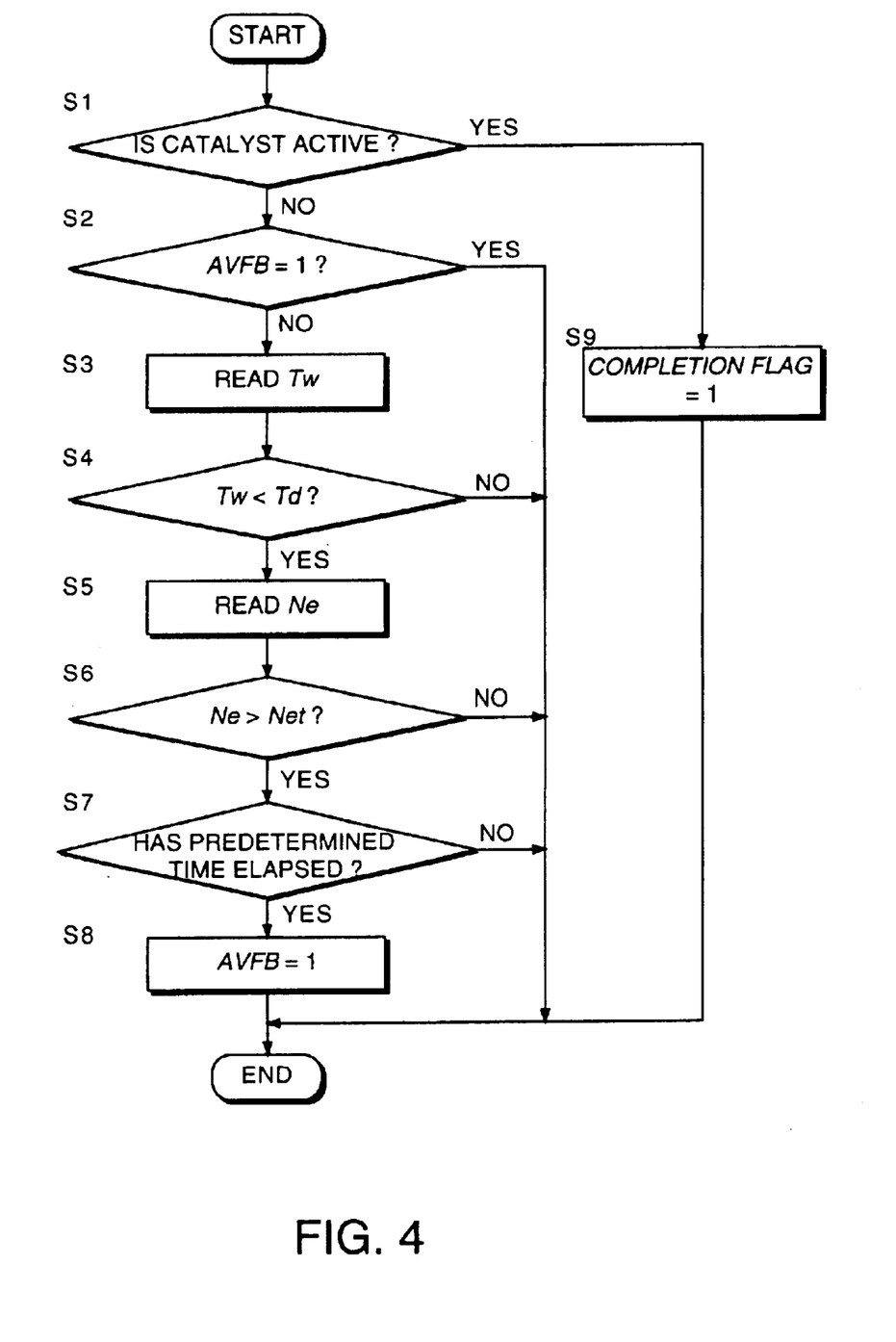
FIG. 4 is a flowchart showing a setting routine for a feedback execution flag AVFB executed by a controller according to this invention.

FIG. 4 shows a setting routine for a feedback execution flag AVFB. The feedback execution flag AVFB is a flag showing whether or not the feedback control on the intake air flow rate and the ignition timing is executed. The feedback execution flag AVFB has an initial value of zero.

The controller 21 executes this routine every ten milliseconds from start-up of the engine 1 until the engine 1 stops running.

Firstly in a step S1, the controller 21 determines whether or not the three-way catalyst of the upstream three-way catalytic converter 16 is activated. This determination is performed by determining whether or not the exhaust gas temperature at the inlet of the upstream three-way catalytic converter 16 detected by the temperature sensor 28 has reached an activation temperature.

When the three-way catalyst reaches activation, after a COMPLETION FLAG is set to a value of unity in a step S9, the routine is terminated. The initial value of COMPLETION FLAG is zero. The actual execution period of this routine is therefore limited to the period for which COMPLETION FLAG is zero, that is to say, the period after starting up the engine 1 up until activation of the three-way catalyst.

When the three-way catalyst is not activated, in a step S2, the controller 21 determines whether or not the feedback execution flag AVFB has a value of unity. The feedback execution flag AVFB herein determined is the feedback execution flag AVFB that was set on the immediately previous occasion the routine was performed.

When the feedback execution flag AVFB does not have a value of unity, in a step S3, the controller 21 reads the cooling water temperature Tw of the engine 1.

Then in a step S4, the cooling water temperature Tw is compared with a predetermined temperature Td representing a determination standard for warm-up completion of the engine 1.

When the cooling water temperature Tw is lower than the predetermined temperature Td, in a step S5, the engine rotation speed Ne is read. The engine rotation speed Ne corresponds to the number of POS signals per unit time.

Then in a step S6, the engine rotation speed Ne is compared with the target idle rotation speed Net.

When the engine rotation speed Ne is greater than the target idle rotation speed Net, in a step S7, the controller 21 determines whether or not a predetermined time has elapsed from the start timing of the engine 1. The predetermined time corresponds to the time elapsed until the time t2 from the start in FIG. 2A.

When the predetermined time after startup in the step S7 has elapsed, the controller 21 sets the feedback execution flag AVFB to unity in a step S8 and terminates the routine.

On the other hand, when the cooling water temperature Tw has reached the predetermined temperature Td in the step S4, or the engine rotation speed Ne has not exceeded the target idle rotation speed Net in the step S6 or the predetermined time has not elapsed after the start timing of the engine 1 in a step S7, the controller 21 immediately terminates the routine.

As shown in the flowchart, the steps S3–S8 are executed only when the feedback execution flag AVFB is zero. Thus the feedback execution flag AVFB is maintained at a value of zero until the cooling water temperature Tw reaches the predetermined temperature Td, the engine rotation speed Ne reaches the target idling rotation speed Net and the predetermined time elapses after starting up the engine 1. The feedback execution flag AVFB is set to unity when all the above conditions are satisfied.

Figure 5A:
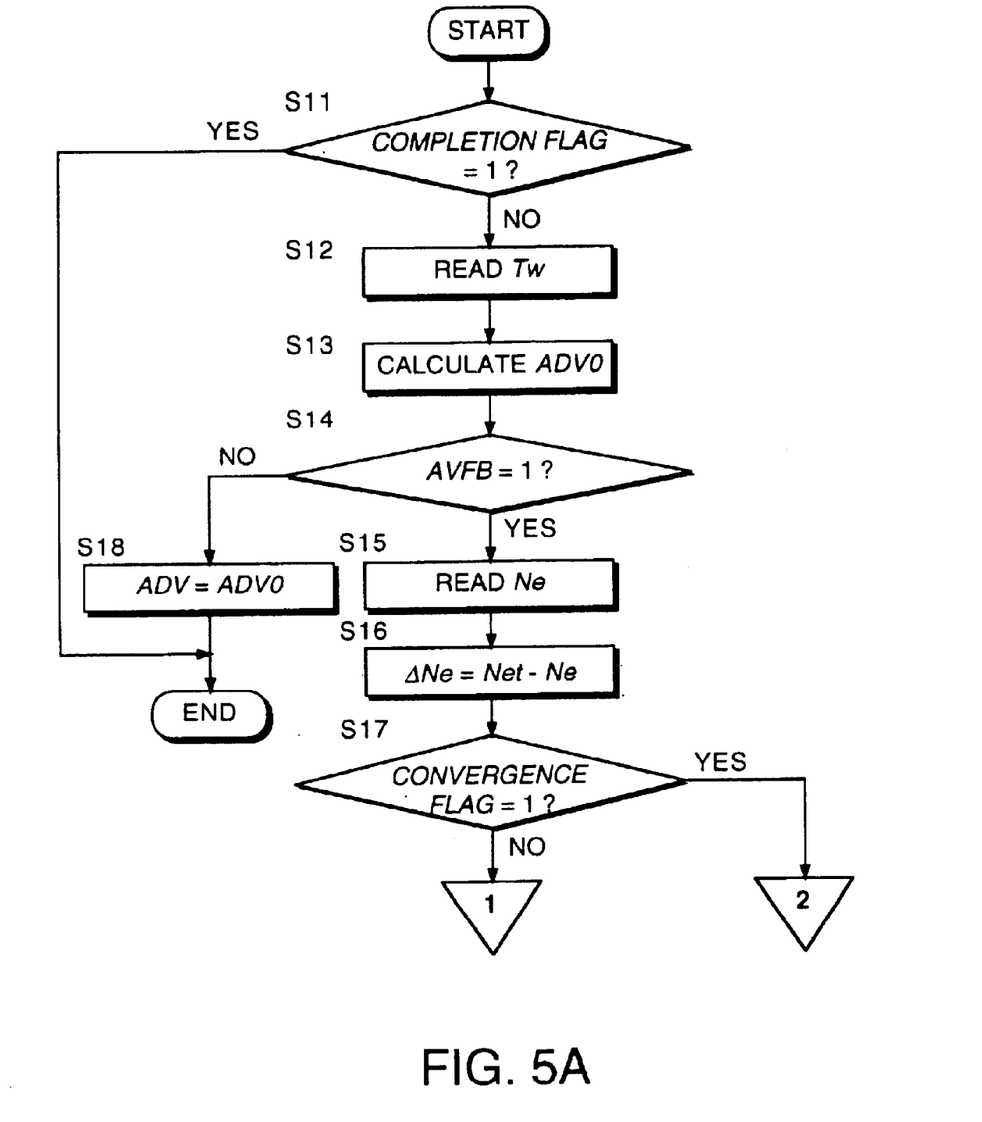
FIGS. 5A–5C are flowcharts describing an ignition timing calculation routine executed by the controller.
Figure 5B:
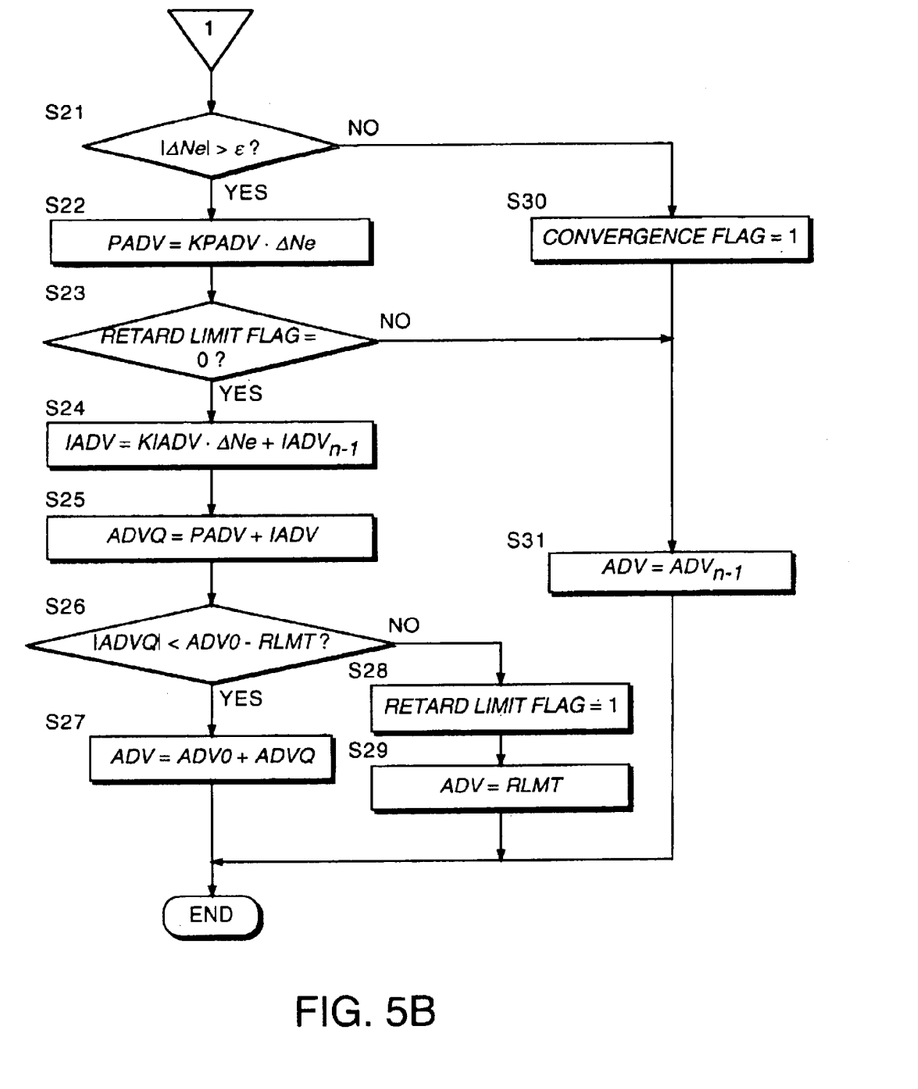
Figure 5C:
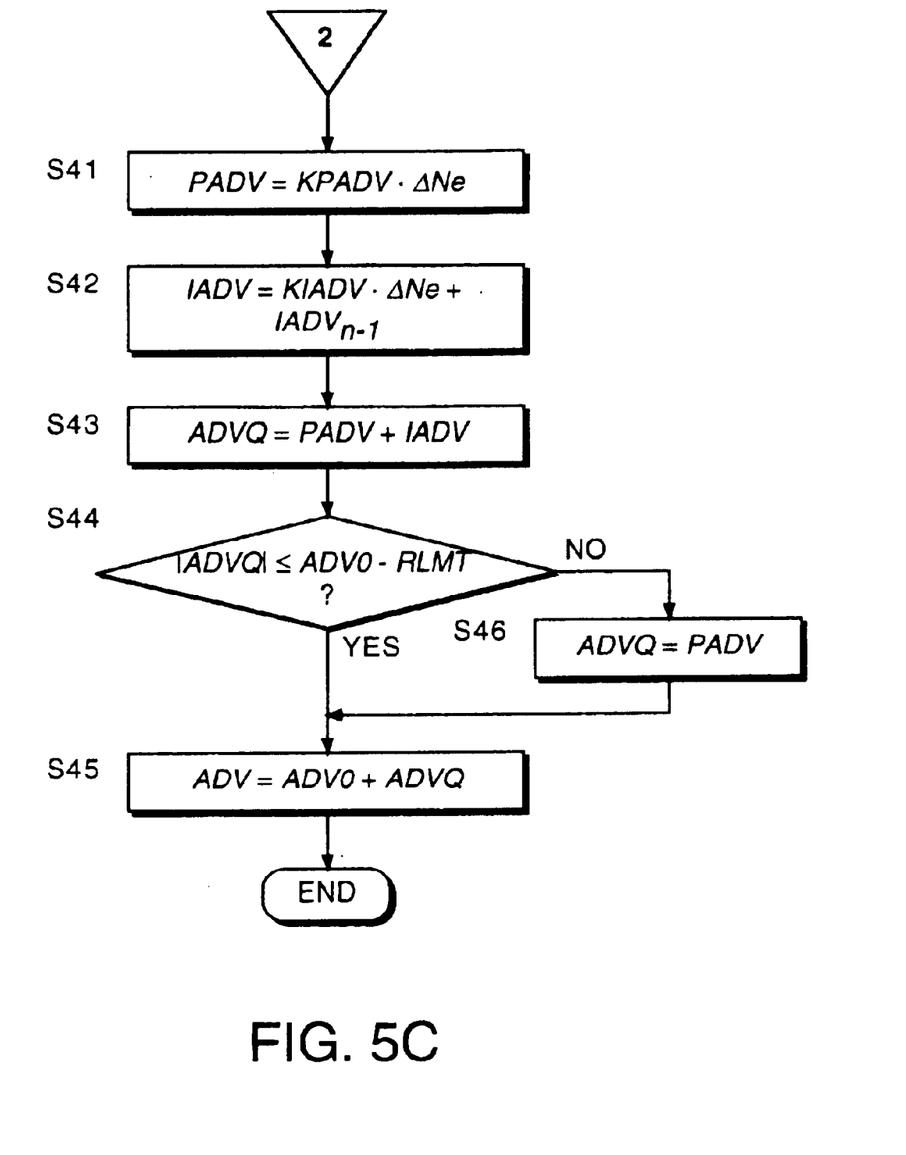

FIGS. 5A–5C shows an ignition timing calculating routine. The controller 21 executes this routine synchronous with the PHASE signal of each cylinder. In a four-cylinder four-stroke-cycle engine, the phase sensor 23 outputs a PHASE signal every 180 degrees. The PHASE signal is a number of pulse signals corresponding to the cylinder number. Thus the controller 21 can identify the cylinder from the PHASE signal. Furthermore the PHASE signal and the POS signal can be used in order to detect an arbitrary piston stroke position for each cylinder, for example of 110 degrees before top dead center (110°BTDC).

Referring to the flowchart in FIGS. 5A–5C, the controller 21 firstly in a step S11, determines whether or not the COMPLETION FLAG has a value of unity. When the COMPLETION FLAG has a value of unity, the routine is terminated without proceeding to subsequent steps. As described above, when the COMPLETION FLAG has a value of unity, it means that the three-way catalyst is activated. Thus the actual execution period of the routine is limited to the period after the start timing of the engine 1 up until activation of the three-way catalyst.

When the COMPLETION FLAG does not have a value of unity in a step S11, the controller 21 reads the cooling water temperature Tw in a step S12.

Then in a step S13, the basic ignition timing ADV0 is calculated using the cooling water temperature Tw. This calculation is performed by looking up a map which is pre-stored in the memory. The basic ignition timing ADV0 is set to a value which advances as the cooling water temperature Tw decreases. In the description hereafter, the units for the ignition timing are expressed as degrees before top dead center (°BTDC).

Then in a step S14, the controller 21 determines whether or not the feedback execution flag AVFB has a value of unity.

When the feedback execution flag AVFB does not have a value of unity, that is to say, when it has a value of zero, in a step S18, the controller 21 sets the target ignition timing ADV to equal the basic ignition timing ADV0 and then terminates the routine.

When the feedback execution flag AVFB has a value of unity, the controller 21 reads the engine rotation speed Ne in a step S15.

Then in a step S16, the controller 21 calculates the difference ΔNe of the engine rotation speed Ne and the target idling rotation speed Net using the following Equation (1).

$$\Delta Ne = Net - Ne \tag{1}$$

When the engine rotation speed Ne is greater than the target idling rotation speed Net as shown in FIG. 2A, the difference ΔNe is a negative value.

Then in a step S17, the controller 21 determines whether or not a CONVERGENCE FLAG has a value of unity. The CONVERGENCE FLAG is set to unity when the engine rotation speed Ne converges to approximately the target idling rotation speed Net as a result of feedback control on the intake air flow rate. The CONVERGENCE FLAG takes values of either unity or zero and has an initial value of zero. Immediately after starting the feedback control on the ignition timing, the CONVERGENCE FLAG has a value of zero. When the CONVERGENCE FLAG has a value of zero, the controller 21 executes the process as shown in FIG. 5B. When the CONVERGENCE FLAG has a value of unity, the controller 21 executes the process in FIG. 5C. As shown in FIGS. 2A–2F, the state where the CONVERGENCE FLAG has a value of zero corresponds to the operating condition of the engine 1 from the start to the time t4. The state where the CONVERGENCE FLAG has a value of unity corresponds to the operating condition after the time t4.

Firstly the case in which the CONVERGENCE FLAG does not have a value of unity, in other words, the case when it has a value of zero will be described. In a step S21 shown in FIG. 5B, the controller 21 determines whether or not the absolute value of the difference ΔNe is greater than the permitted range described above. Immediately after starting feedback control on the ignition timing, the absolute value of the difference ΔNe is of course greater than the permitted range ε.

When the absolute value of the difference ΔNe is greater than the permitted range ε, in a step S22, the controller 21 calculates a proportional component PADV for the feedback control on the ignition timing from Equation (2) below.

$$PADV = KPADV\,DNe \quad (2)$$

where,
KPADV=proportional constant.

When the engine rotation speed Ne exceeds the target idle rotation speed Net as shown in FIG. 2A, since the difference ΔNe is negative, the proportional component PADV is negative.

Then in a step S23, it is determined whether or not a RETARD LIMIT FLAG has a value of zero.

The RETARD LIMIT FLAG is a flag which is set to unity when the ignition timing reaches the stable combustion limit shown by the dotted line in FIG. 3 as a result of feedback control on the ignition timing. This flag has a value of either unity or zero and an initial value of zero. Thus immediately after starting feedback control on the ignition timing, the RETARD LIMIT FLAG has a value of zero.

When the RETARD LIMIT FLAG has a value of zero in the step S23, the controller 21 calculates the integral component IADV for the feedback control on the ignition timing in a step S24 from Equation (3).

$$IADV = KIADV\,\Delta Ne + IADV_{n-1} \quad (3)$$

where,
KIADV=integral constant, and
$IADV_{n-1}$=previous value of integral constant IADV.

The initial value of the integral component IADV calculated by Equation (3) is zero. When the engine rotation speed Ne is greater than the target idle rotation speed Net as shown by FIG. 2A, since the difference ΔNe is negative, the integral component IADV is also negative.

Then in a step S25, the feedback correction ADVQ for the ignition timing is calculated from Equation (4).

$$ADVQ = PADV + IADV \quad (4)$$

Next in a step S26, it is determined whether or not the feedback correction amount ADVQ is within the range of the retard limit RLMT by Equation (5). When the feedback correction amount ADVQ lies within the range of the retard limit RLMT, Equation (5) is satisfied.

$$|ADVQ| < ADV0 - RLMT \quad (5)$$

In the step S26, when the relationship in Equation (5) is satisfied, the controller 21 determines the target ignition timing ADV using Equation (6) below in a step S27. After the process in the step S27, the controller 21 terminates the routine.

$$ADV = ADV0 + ADVQ \quad (6)$$

In the step S26, when the relationship in the Equation (5) is not satisfied, the controller 21 sets the RETARD LIMIT FLAG to unity in a step S28. Then in a step S29, the target ignition timing ADV is set to equal the retard limit RLMT.

After the process in the step S29, the controller 21 terminates the routine.

On the other hand, in the step S21, when the absolute value of the difference ΔNe is not greater than the permitted range ε, the controller 21 sets the CONVERGENCE FLAG to unity in a step S30.

Then in a step S31, the target ignition timing ADV is set equal to a value $ADV_{n-1}$ calculated on the immediately previous occasion the routine was executed and the routine is terminated.

When the RETARD LIMIT FLAG is not zero in the step S23, that is to say, when it has a value of unity, the controller 21 sets the target ignition timing ADV in the step S31 to equal to the value $ADV_{n-1}$ calculated on the immediately previous occasion and the routine is terminated.

Therefore the target ignition timing ADV is fixed to the previous value $ADV_{n-1}$ when the engine rotation speed Ne has converged to the permitted range ε or when the ignition timing has reached the retard limit RLMT Next the process when the CONVERGENCE FLAG has a value of unity in the step S17 will be described referring to FIG. 5C. This case corresponds to the conditions after the time t4 as shown in FIGS. 2A–2D. Under these conditions, when the target ignition timing ADV is simply maintained to a value of the retard limit RLMT, the routine can not deal with a situation in which the engine rotation speed Ne falls below the target idling rotation speed Net for some reason as shown by the dotted line in the time interval t5–t7 in FIG. 2A.

After the engine rotation speed Ne converges to approximately the target idling rotation speed Net, therefore, the controller 21 executes the feedback on the ignition timing based on the difference ΔNe of the engine rotation speed Ne and the target idling rotation speed Net until the upstream three-way catalytic converter 16 is activated.

Firstly in a step S41, the controller 21 calculates the proportional component PADV for feedback control of the ignition timing using Equation (2) in the same manner as the step S19.

Then in a step S42, the integral component IADV is calculated for feedback control of the ignition timing using Equation (3) in the same manner as the step S22.

In a step S43, the feedback correction amount ADVQ for the ignition timing is calculated using Equation (4) in the same manner as the step S24.

In the time interval t3–t5 shown in FIG. 2A, the target ignition timing ADV if fixed to the retard limit RLMT. The feedback correction amount ADVQ calculated in the step S41–S43 corresponds to the advance amount of the ignition timing from the retard limit RLMT for increasing the engine rotation speed Ne.

Next in a step S44, it is determined whether or not the Equation (5) is satisfied in the same manner as the step S26. The feedback correction amount ADVQ is a positive value, that is to say, it is an advance amount. Thus the determination performed in the step S34 determines whether or not the target ignition timing ADV has been advanced more than the basic ignition timing ADV0, as a result of the advance correction due to the feedback correction amount ADVQ.

In a step S44, when the relationship in the Equation (5) is satisfied, that is to say, when the target ignition timing ADV is not advanced more than the basic ignition timing ADV0 even when an advancing correction is performed using the feedback correction amount ADVQ, the controller 21 determines the target ignition timing ADV using Equation (6) in the same manner as the step S24.

On the other hand, when the relationship in Equation (5) is not satisfied in the step S44, that is to say, when the target ignition timing ADV is advanced to more than the basic ignition timing ADV0 when performing advancing corrections using the feedback correction amount ADVQ, the controller 21 resets the feedback correction amount ADVQ in a step S46 so that it equals the proportional component PADV for feedback control. Thereafter the process proceeds to a step S45 and the target ignition timing ADV is determined using Equation (6).

After the step S45, the controller 21 terminates the routine.

The reason that the feedback correction amount ADVQ is set equal to the proportional component PADV for feedback control in the step S46, that is to say, the reason why the integral component IADV is ignored is as follows.

A term MBT in the FIG. 2E is an abbreviation for minimum spark advance for best torque and represents the minimum advance value required to maximize the output torque of the engine 1. It is known from U.S. Pat. No. 5,884,605 that when the engine 1 is idling, a phenomenon results in which engine rotation speed Ne reacts excessively with a delay with respect to variation in the ignition timing in the vicinity of MBT. This phenomenon is so-called "hunting".

Thus as shown in the broken line after the time t6 in FIG. 2E, it is sometimes the case that the engine rotation speed Ne does not become stable when feedback control is performed on the ignition timing using the feedback correction ADVQ calculated from Equation (4) under conditions such that the target ignition timing ADV is advanced to more than the basic ignition timing ADV0.

This control device is adapted so that the target ignition timing ADV does not approach MBT as a result of accumulating the integral component IADV. This is achieved by resetting the feedback correction amount ADVQ equal to the proportional component PADV of the feedback control in the step S46. As a result, a deviation in the engine rotation speed Ne is not produced due to the fact that the target ignition timing ADV does not approach MBT as shown by the dotted line after the time t6 in FIG. 2E. Herein, the basic ignition timing ADV0 is set to be smaller than MBT in view of the advancing amount.

The target ignition timing ADV set in the routine in FIGS. 5A–5C is stored in the memory of the controller 21. The controller 21 ignites the gaseous mixture by outputting an ignition signal to the sparking coil 7 when the crank angle of the engine 1 as detected from the PHASE signal and the POS signal coincides with the target ignition timing ADV.

Even when the target ignition timing ADV reaches the retard limit RLMT as shown by the time t3 in FIGS. 2A–2F as a result of ignition timing control described above, if the engine rotation speed Ne has not converged to approximately the target idle rotation speed Net, the controller 21 promotes convergence of the engine rotation speed Ne to approximately the target idle rotation speed Net. This is achieved by reducing the intake air flow rate by executing a routine shown in FIG. 6.

Figure 6:
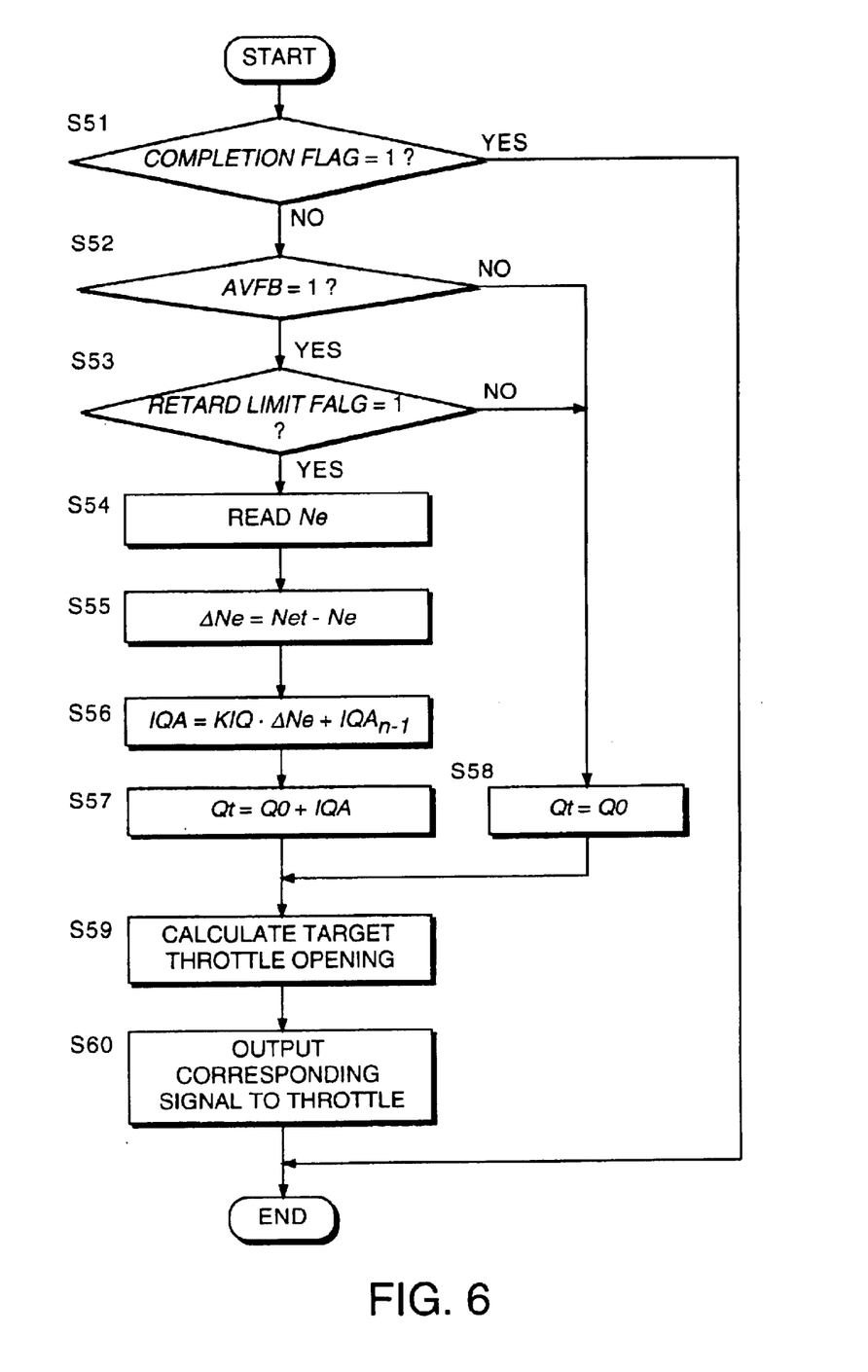
FIG. 6 is a flowchart describing a calculation routine for a target throttle opening executed by the controller.

The controller 21 executes this routine every ten milliseconds while the engine 1 is operating.

Firstly in a step S51, the controller 21 determines whether or not the COMPLETION FLAG has a value of unity.

When the COMPLETION FLAG has a value of unity, the controller 21 immediately terminates the routine without proceeding to subsequent steps. The execution of this routine is also limited to the period from starting up the engine 1 to activation of the three-way catalyst.

When the COMPLETION FLAG does not have a value of unity, the controller 21 determines whether or not the feedback execution flag AVFB has a value of unity in a step S52. When the feedback execution flag AVFB has a value of unity, in a step S53, it is determined whether or not the RETARD LIMIT FLAG has a value of unity.

When both the feedback execution flag AVFB and RETARD LIMIT FLAG have a value of unity, it means that feedback control on the ignition timing by the routine shown in FIGS. 5A–5C has been performed, and the target ignition timing ADV has been fixed to the retard limit RLMT. This corresponds to the conditions after the time t3 as shown in FIGS. 2A–2F.

When these conditions are established, the controller 21 reads the engine rotation speed Ne in a step S54.

Then in a step S55, the difference $\Delta Ne$ of the engine rotation speed Ne and the target idling rotation speed Net is calculate from Equation (1) in the same manner as the step S16 in FIG. 5A.

Next in a step S56, the integral component IQA for the feedback control on the intake air flow rate is calculated using Equation (7).

$$IQA = KIQ \cdot \Delta Ne + IQA_{n-1} \qquad (7)$$

where,

KIQ=integral constant, and $IQA_{n-1}$=IQA calculated on the immediately previous occasion the routine was executed.

The initial value of IQA in Equation (7) is zero.

In a next step S57, a target intake air flow rate Qt is calculated using Equation (8).

$$Qt = Q0 + IQA \qquad (8)$$

where,

Q0=basic intake air flow rate.

The process executed in the steps S55–S57 corresponds to integral control on the target intake air flow rate Qt based on the engine rotation speed difference $\Delta Ne$.

The basic intake air flow rate Q0 corresponds to the air flow rate in the intake passage 2 when cranking of the engine 1 is started by the step motor. In the same engine, this means that an increase in the cranking rotation speed, that is to say racing, will increase sharply as the value Q0 increases. Therefore, the value for the basic intake air flow rate Q0 is set experimentally so that the increase characteristics of the cranking rotation speed are optimized.

As shown in FIGS. 2A–2F, this routine is executed when the engine rotation speed Ne is higher than the target idling rotation speed Net even after the target ignition timing ADV reaches the retard limit RLMT. Thus $\Delta Ne$ calculated in the step S55 is a negative value and the integral component IQA calculated in the step S56 is also a negative value. In other words, the target intake air flow rate Qt decreases as the process in the steps S54–S57 is repeated. After the process in the step S57, the controller 21 performs the process in a step S59.

When the feedback execution flag AVFB does not have a value of unity in the step S52, or when the RETARD LIMIT FLAG does not have a value of unity in the step S53, the controller 21 sets the target intake air flow rate Qt to equal the basic intake air flow rate Q0 in a step S58. This process means that a reducing correction is applied to the intake air flow rate based on the engine rotation speed difference $\Delta Ne$.

After the target intake air flow rate Qt is determined in the step S57 or the step S58, the controller 21 determines the target opening of the electronic throttle 11 in response to the target intake air flow rate Qt in the step S59.

Then in a step S60, the opening of the electronic throttle 11 is controlled to the target opening on the basis of a signal output to the step motor which drives the electronic throttle 11. The actual opening of the electronic throttle 11 is input to the controller 21 as described above from the throttle sensor 29. The controller 21 controls the step motor so that the actual opening of the electronic throttle 11 coincides with the target opening.

As shown by FIGS. 2A–2F, the result of the control routines above performed by the controller 21 is that the engine rotation speed Ne reaches a peak at a time t1 after starting cranking of the engine 1. In addition, the conditions in the step S7 of the routine shown in FIG. 4 are realized at the time t2 and the feedback execution flag AVFB is set to unity. Before the time t2, the engine 1 is operated using the basic ignition timing ADV0 and the reference intake air flow rate Q0.

After the feedback execution flag AVFB is varied to a value of unity, feedback correction based on the rotation speed difference ΔNe of the ignition timing ADV is started in the routine shown in FIGS. 5A–5C. The target ignition timing ADV is retarded by the amount ADVQ, the sum of the proportional component PADV and the integral component IPAV. At this time, since the integral component PADV calculated in the step S22 is proportional to the engine rotation speed difference ΔNe, the proportional component PADV decreases as the engine rotation speed Ne decreases as shown in FIG. 2C. On the other hand, since the integral component IADV calculated in the step S24 is accumulated, the integral component IADV increases as time elapses as shown in FIG. 2D. Consequently the target ignition timing ADV first undergoes a large retard at the time t2 as shown in FIG. 2E and then gradually increases the level of the retard.

After the ignition timing reaches the retard limit RLMT at the time t3, the target ignition timing ADV is fixed to the retard limit RLMT and the RETARD LIMIT FLAG is set to a value of unity in the step S28 as shown in FIG. 5B. As a result, when the routine is subsequently executed, the target intake air flow rate Qt is reduced. This is achieved by executing the process in the steps S54–S57 in FIG. 6 and performing integral feedback control on the intake air flow rate based on the engine rotation speed difference ΔNe while maintaining the target ignition timing ADV at the retard limit RLMT.

At the time t4, the engine rotation speed difference ΔNe converges to the permitted range ϵ. If no further variation in the conditions occurs, the ignition timing ADV and the intake air flow rate Qt at that point in time are held constant.

In this manner, this start-up control device enables the engine rotation speed Ne to be reduced by retarding the ignition timing ADV while maintaining the intake air flow rate to the basic intake air flow rate Q0. Even when the ignition timing ADV reaches the retard limit RLMT, if the engine rotation speed Ne is still higher than the target idling rotation speed Net, the engine rotation speed Ne is made to converge to the target idle rotation speed Net as a result of reducing the intake air flow rate.

Thus it is possible to make the engine rotation speed Ne rapidly converge to the target idling rotation speed Net without impeding increases in the exhaust gas temperature.

However after the engine rotation speed difference ΔNe has converged to the permitted range ϵ, it is sometimes the case that the engine rotation speed Ne will abruptly decrease for some reason before the upstream three-way catalytic converter 16 is activated, as shown by the dotted line after the time t5 in FIG. 2A.

In this case, the controller 21 advances the ignition timing from the retard limit RLMT using the process in the steps S41–S43 in FIG. 5C. As a result, when the target ignition timing ADV exceeds the basic ignition timing ADV0, the feedback correction ADVQ is reset in a step S46 to equal the proportional component PADV for feedback control. Thus, if exceeding the basic ignition timing ADV0, the target ignition timing ADV can be returned to a basic ignition timing ADV0 in a short time. Due to this operation, the target ignition timing ADV is prevented from hunting in the vicinity of MBT.

At the time t5, since the RETARD LIMIT FLAG is already set to a value of unity, the control on the intake air flow rate in the routine in FIG. 6 is performed based on the engine rotation speed difference ΔNe. As a result, the intake air flow rate Qt is also increased. However the characteristics of the increase in the intake air flow rate Qt at this time are not uniform due to the load on the engine at a given time as shown by FIG. 2F. The fluctuation in the load on the engine 1 results from driving auxiliary devices for example.

This idling control device uses integral/proportional control in order to control the ignition timing of the spark plug 6 as described above. Proportional/integral control has the following advantages in comparison to controlling the ignition timing only using proportional control.

Figure 7A:
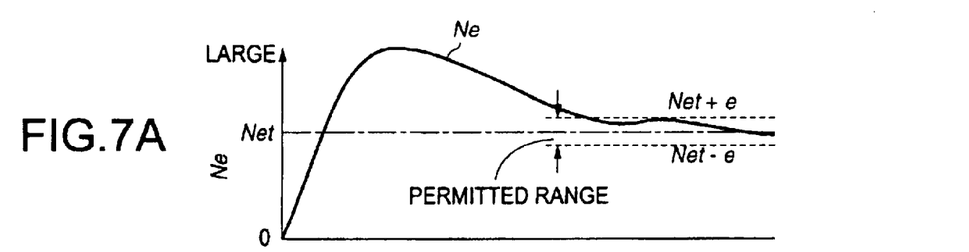
FIGS. 7A–7E are timing charts describing the difference between feedback control for ignition timing only using proportional control and feedback control for ignition timing according to proportional/integral control executed by the controller.
Figure 7B:
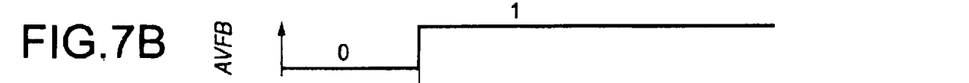
Figure 7C:
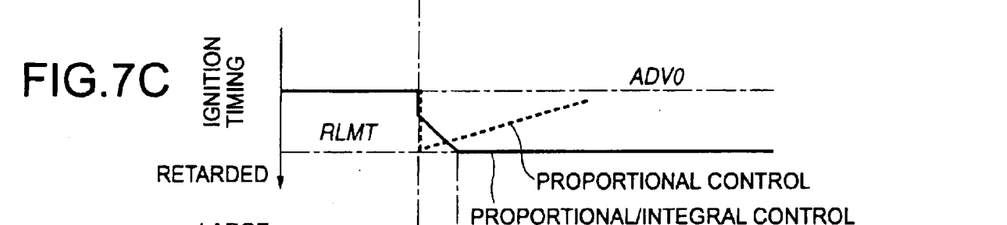
Figure 7D:
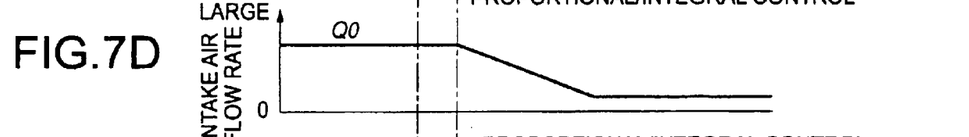

Referring to FIGS. 7A–7E, controlling the ignition timing only using proportional control results in the ignition timing undergoing a large retard due to the large value for the proportional component as shown by the broken line in FIG. 7C. This occurs at the moment when the feedback control on the ignition timing is started at a time t2 at which the engine rotation speed Ne starts descending from the peak. However as the engine rotation speed Ne approaches the target idling rotation speed Net, the value for the proportional component decreases and the ignition timing returns to the basic ignition timing ADV0 in a short time.

Figure 7E:
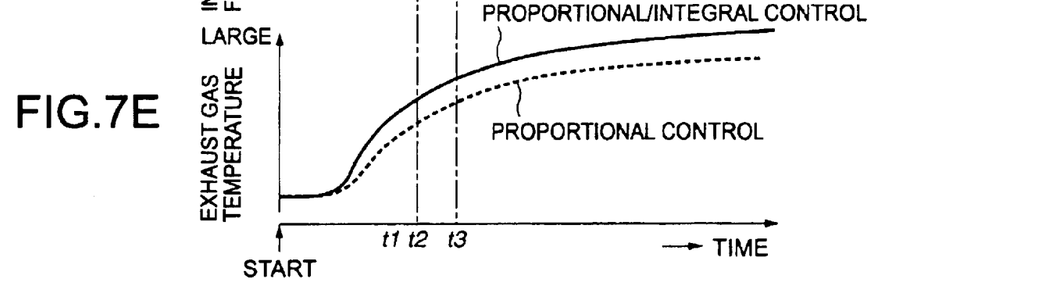

Immediately after starting the engine 1, it is necessary to activate the three-way catalyst in the upstream three-way catalytic converter 16 as soon as possible. As a result, it is preferred that the ignition timing is maintained at the retard limit RLMT. However if the ignition timing is controlled only using proportional control, even when the retard limit RLMT is momentarily reached, it is not possible to maintain the ignition timing at the retard limit RLMT. In contrast, when using proportional/integral control, as shown by the solid line in FIG. 7C, even after the difference ΔNe of the target idling rotation speed Net and the engine rotation speed Ne has converged, the ignition timing can be maintained to the retard limit RLMT. As a result, it is possible to rapidly increase the exhaust gas temperature as shown in FIG. 7E.

When the ignition timing is controlled only using proportional control, if the proportional constant KPADV in Equation (2) is set to a large value, although it is possible to maintain the ignition timing at the retard limit RLMT, the operation of the engine 1 becomes unstable since the ignition timing undergoes a large variation as a result of slight fluctuation in the engine rotation speed Ne.

The contents of Tokugan 2002-58577, with a filing date of Mar. 5, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A start-up control device for an internal combustion engine, the engine comprising a throttle regulating an intake air flow rate and a spark plug igniting a gaseous mixture, and increasing a rotation speed at start-up towards a peak value beyond a target idle rotation speed, the device comprising:
   a sensor which detects a rotation speed of the engine; and
   a controller functioning to:
      feedback control an ignition timing of the spark plug, when the engine rotation speed has started to decrease from the peak value, to cause the rotation speed of the engine to converge to the target idle rotation speed; and
      control an opening of the throttle to cause the intake air flow rate to be reduced, if the rotation speed is still not converged to the target idle rotation speed after the ignition timing of the spark plug has been controlled.

2. The startup control device as defined in claim 1, wherein the controller is further functioning to retard the ignition timing of the spark plug when the rotation speed is higher than a target idle rotation speed.

3. The startup control device as defined in claim 1, wherein the controller is further functioning to maintain the throttle at a fixed opening until the ignition timing reaches a predetermined retard limit.

4. The startup control device as defined in claim 3, wherein the retard limit is set to a smaller retarding value than a stable operation limiting retard value on the ignition timing which is defined according to an air/fuel ratio of the gaseous mixture when the engine was started.

5. The startup control device as defined in claim 3, wherein the controller is further functioning to maintain the ignition timing at the retard limit when the rotation speed remains higher than the target idle rotation speed even after the ignition timing has retarded to the retard limit, and control the opening of the throttle to cause the intake air flow rate of the engine to be reduced.

6. The startup control device as defined in claim 1, wherein the controller is further functioning to control the ignition timing of the spark plug by performing proportional/integral feedback control based on a difference of the rotation speed of the engine and the target idle rotation speed.

7. The startup control device as defined in claim 1, wherein the controller is further functioning to control the opening of the throttle by performing proportional feedback control based on a difference of the rotation speed of the engine and the target idle rotation speed.

8. A start-up control device for an internal combustion engine, the engine comprising a throttle regulating an intake air flow rate and a spark plug igniting a gaseous mixture, the device comprising:
   a sensor which detects a rotation speed of the engine; and
   a controller functioning to:
      control an ignition timing of the spark plug to cause the rotation speed of the engine to converge to a target idle rotation speed; and
      control an opening of the throttle to cause the intake air flow rate to be reduced, if the rotation speed is still not converged to the target idle rotation speed after the ignition timing of the spark plug has been controlled,
   wherein the controller is further functioning to advance the ignition timing of the spark plug by performing proportional/integral feedback control based on a difference of the rotation speed of the engine and the target idle rotation speed to cause the rotation speed to converge to the target idle rotation speed when the rotation speed of the engine decreases after having converged to the target idle rotation speed, and to control the ignition timing of the spark plug by only applying proportional feedback control based on the difference of the rotation speed of the engine and the target idle rotation speed, when an advancing amount due to the proportional/integral feedback control has become larger than a predetermined basic advancing amount of the ignition timing.

9. The startup control device as defined in claim 8, wherein the start-up control device further comprises a sensor which detects a cooling water temperature of the engine, and the controller is further functioning to set the predetermined basic advancing amount based on the cooling water temperature.

10. The startup control device as defined in claim 8, wherein the predetermined basic advancing amount is set to a smaller value than a minimum spark advance for best torque which obtains maximum torque.

11. A start-up control device for an internal combustion engine, the engine comprising a throttle regulating an intake air flow rate and a spark plug igniting a gaseous mixture, and increasing a rotation speed at start-up towards a peak value beyond a target idle rotation speed, the device comprising:
   means for detecting a rotation speed of the engine;
   means for feedback controlling an ignition timing of the spark plug, when the engine rotation speed has started to decrease from the peak value, to cause the rotation speed of the engine to converge to the target idle rotation speed; and
   means for controlling an opening of the throttle to cause the intake air flow rate to be reduced, if the rotation speed is still not converged to the target idle rotation speed after the ignition timing of the spark plug has been controlled.

12. A start-up control method for an internal combustion engine, the engine comprising a throttle regulating an intake air flow rate and a spark plug igniting a gaseous mixture, and increasing a rotation speed at start-up towards a peak value beyond a target idle rotation speed, the method comprising:
   detecting a rotation speed of the engine;
   feedback controlling an ignition timing of the spark plug, when the engine rotation speed has started to decrease from the peak value, to cause the rotation speed of the engine to converge to the target idle rotation speed; and
   controlling an opening of the throttle to cause the intake air flow rate to be reduced, if the rotation speed is still not converged to the target idle rotation speed after the ignition timing of the spark plug has been controlled.

* * * * *